United States Patent
Mohseen et al.

(10) Patent No.: US 7,776,417 B2
(45) Date of Patent: Aug. 17, 2010

(54) SELF-ADHESIVE VENTILATING WATERPROOFING MEMBRANE

(75) Inventors: Shaik Mohseen, Mountain Top, PA (US); Natalino Zanchetta, Reno, NV (US)

(73) Assignee: Polyglass USA, Inc., Hazelton, PA (US)

( * ) Notice: Subject to any disclaimer, the term of this patent is extended or adjusted under 35 U.S.C. 154(b) by 0 days.

(21) Appl. No.: 11/075,130

(22) Filed: Mar. 8, 2005

(65) Prior Publication Data

US 2005/0202197 A1   Sep. 15, 2005

Related U.S. Application Data

(60) Provisional application No. 60/551,683, filed on Mar. 9, 2004.

(51) Int. Cl.
*B32B 9/00* (2006.01)
*B32B 7/12* (2006.01)
*B32B 15/04* (2006.01)
*D06N 5/00* (2006.01)

(52) U.S. Cl. ............ 428/40.1; 428/40.3; 428/353; 428/354; 428/489; 428/490; 52/309.1

(58) Field of Classification Search .......... 428/40.1, 428/40.3, 41.3, 148, 353, 354, 489, 490, 428/906; 52/309.1
See application file for complete search history.

(56) References Cited

U.S. PATENT DOCUMENTS

| | | | |
|---|---|---|---|
| 3,554,835 A | 1/1971 | Morgan | |
| 4,386,981 A | 6/1983 | Clapperton | |
| 4,670,071 A | 6/1987 | Cooper et al. | |
| 4,757,652 A | 7/1988 | Kalkanoglu | |
| 5,082,704 A | 1/1992 | Higgins | |
| 5,143,766 A | 9/1992 | Wenz et al. | |
| 5,591,290 A | 1/1997 | Walter et al. | |
| 5,667,889 A | 9/1997 | Katsura et al. | |
| 5,756,214 A | 5/1998 | Waldron et al. | |
| 5,766,729 A | 6/1998 | Zanchetta et al. | |
| 5,807,911 A | 9/1998 | Drieskens et al. | |
| 5,843,522 A | 12/1998 | Zanchetta et al. | |
| 5,910,370 A | 6/1999 | Katsura et al. | |
| 5,916,654 A | 6/1999 | Phillips et al. | |
| 5,932,352 A | 8/1999 | Higgins | |
| 5,964,946 A | 10/1999 | Zanchetta et al. | |

(Continued)

FOREIGN PATENT DOCUMENTS

DE   20 2004 010 576 U1   10/2005

(Continued)

OTHER PUBLICATIONS

Search Report from PCT/EP05/051062, dated Jun. 30, 2005.

*Primary Examiner*—Patricia L Nordmeyer
(74) *Attorney, Agent, or Firm*—Kenyon & Kenyon LLP

(57) ABSTRACT

A self-adhesive ventilating modified bituminous roofing composite in which the release liner is printed with a transfer chemical such that upon removal of the release liner, the adhesive portion of the membrane is rendered non-adhesive in a pattern that provides ventilation pathways that allow for the lateral escape of pressure or latent moisture once the substrate is affixed to the roofing surface, thereby extending the life of the roofing system.

85 Claims, 3 Drawing Sheets

U.S. PATENT DOCUMENTS

| | | |
|---|---|---|
| 6,083,616 A | 7/2000 | Dressler |
| 6,360,506 B1 | 3/2002 | Graae |
| 6,426,129 B1 | 7/2002 | Kalwara et al. |
| 6,453,628 B2 | 9/2002 | Traxler |
| 6,464,821 B1 * | 10/2002 | Phillips et al. ............ 156/304.1 |
| 6,641,896 B2 | 11/2003 | Fensel et al. |
| 6,901,712 B2 * | 6/2005 | Lionel ......................... 52/408 |
| 2001/0031353 A1 | 10/2001 | Hannington |
| 2001/0052384 A1 | 12/2001 | Hannington |
| 2002/0011306 A1 | 1/2002 | Hannington et al. |
| 2004/0013854 A1 * | 1/2004 | Zanchetta et al. ........... 428/156 |
| 2004/0213993 A1 | 10/2004 | Hannington |
| 2005/0039847 A1 | 2/2005 | Hannington et al. |

FOREIGN PATENT DOCUMENTS

| | | |
|---|---|---|
| WO | WO 99/15600 | 4/1999 |
| WO | WO 01/81080 | 11/2001 |
| WO | WO 2005/085380 | 9/2005 |

* cited by examiner

SELF-ADHESIVE VENTILATING WATERPROOFING MEMBRANE

REFERENCE TO RELATED APPLICATION(s)

This application claims priority to provisional application no. 60/551,683 filed on Mar. 9, 2004, the entire contents of which are hereby expressly incorporated by reference in Their entirety.

BACKGROUND OF THE INVENTION

The present invention relates to construction materials for waterproofing, sealing and/or otherwise covering construction surfaces and to a method of manufacturing such materials. More particularly, the present invention relates to self-adhesive roofing materials that "partially adhere" to the underlying substrate surface. The present invention also relates to other self-adhesive materials for covering construction surfaces, such as a foundations, walls, roads or bridges, where "partial adhesion" to the underlying surface is advantageous. Such materials include, for example, insulation, foundation sealing material, road construction material and waterproofing materials for bridges and tunnels. The self-adhesive construction materials of the present invention permit easy and hassle-free field application, and good adhesion, while at the same time providing a ventilating mechanism that allows for lateral release (or venting) of potentially harmful pressure and latent moisture once the material is in place.

Waterproofing membranes are well known and commonly used in the roofing industry. It is also well known to use bituminous compositions to manufacture waterproofing materials that are generally used for roof covering and roofing underlayments. Modified bituminous roofing was invented in Europe in the 1960s, and has been used successfully in the United States for over 25 years. These materials are known in the industry as modified bituminous prepared roofing, and include modified bitumen roofing membranes. They typically comprise a carrier (or core) which is saturated and/or coated on one or both sides with a modified bituminous material. The carrier is typically a reinforcement support sheet made of fabric, such as polyester, fiberglass, or a combination of both. For some applications a simple film-based carrier such as a polyolefin (e.g. polybutadiene, polypropylene, or polyethylene) or polyester film may be used. The modified bituminous material comprises bitumen modified with a material that enhances its physical properties.

As used herein, the terms "modified bitumen" and "modified bituminous coating/layer" are defined as a composition comprising bitumen and any material that enhances the inherent physical properties of the bitumen and the resultant roofing membrane, such as heat stability, low temperature hardening point, and mechanical strength. The property enhancing material is referred to herein as the modifier. Bitumen modifiers are well known in the art and typically include synthetic polymers such as atactic polypropylene (APP), amorphous poly alpha olefin (APAO), polypropylene ethylene copolymers, polyethylene (PE), polyoxyethylene, thermoplastic polyolefin (TPO), styrene-butadiene-styrene (SBS), styrene-ethylene-butadiene-styrene (SEBS), sytrene-isoprene-styene (SIS), synthetic rubber, but may include any other materials having the desired physical property enhancing effect. The terms "unmodified bitumen" or "unmodified bituminous coating layer" are defined as a bituminous composition or layer comprising bitumen but no modifier, i.e. no material that enhances the bitumen's inherent physical properties.

As discussed above, use of modified bitumen imparts several desirable properties to the resultant roofing membrane. For example, when the carrier is saturated in and coated with a modified bitumen compound such that the modified bituminous compound penetrates the fibers and pores of the carrier, the resulting waterproofing material has good heat stability and low temperature flexibility, and consequently a wider service temperature range. Generally "low temperature" means around the freezing point, i.e. about 0 degrees Celsius, but could vary depending upon the intended application. Such membranes also possess good weatherability characteristics, as well as high strength and elongation properties, which provide resistance to roof movements, thermal induced fatigue and mechanical induced fatigue (e.g. to prevent cracks, to prevent damage from temperature fluctuations and to prevent physical damage, respectively). Different types of modifiers impart different characteristics to the membrane. For example, the typical softening point temperature of an APP modified bitumen compound is in excess of 150 degrees Celsius, whereas that of a conventional SBS modified bitumen compound is approximately 120 degrees Celsius. In addition, an APP modified compound utilized on the top surface offers plastomeric characteristics to the bitumen, making the membrane very hard and imparting improved flow resistance at high temperatures. U.S. Pat. Nos. 5,766,729, 5,843,522 and 5,964,946, to Zanchetta et al. relate to modified bituminous roofing membranes and are hereby incorporated by reference in their entirety.

Prior to the introduction of modified bitumen roofing membranes, built-up-roofing (BUR) was being used in the United States since the turn of the $20^{th}$ century. BUR is manufactured by saturating and coating both sides of a reinforcement carrier support sheet made of organic felt or fiberglass with unmodified bituminous coating material. This method, however, generally requires in situ application of additional bitumen layers, which involves pouring hot bitumen onto the substrate surface, applying the BUR sheet on the hot bitumen, and pouring another layer of hot bitumen on top of the BUR sheet. While the unmodified bitumen used to coat the reinforcement during the manufacturing process may include a filler, the hot bitumen used during installation includes no additives at all.

The roofing membrane market is largely divided into two major classifications: commercial/industrial and residential applications. In both these markets there are two major types of modified bitumen roofing products. They are known as the "cap sheet" and "base sheet".

The "cap sheet" takes its name from the fact that its top surface is exposed to the elements. The bituminous component of a cap sheet may be modified with a variety of modifiers, including atactic polypropylene (APP), amorphous poly alpha olefin (APAO), polypropylene ethylene copolymers, polyethylene (PE), polyoxyethylene, thermoplastic polyolefin (TPO), styrene-butadiene-styrene (SBS), styrene-ethylene-butadiene-styrene (SEBS), sytrene-isoprene-styene (SIS), synthetic rubber or other bituminous modifiers. The carrier component may be a polyester carrier, fiberglass or polyester/fiberglass combination mat or carrier. Cap sheets can be smooth or granule-surfaced. Modified bitumen membranes which do not have factory-applied granule or foil surfacing need some form of field-applied ultraviolet protective coating. The thickness of cap membranes is typically between 2.8 mm and 5.0 mm for both granulated and smooth (non-granulated) surfaces.

In most roofing systems a base sheet is applied under the cap sheet. The bituminous component of the base sheet can be modified using any of the same modifiers as the cap sheet. Because the base sheet is not intended to be exposed to the elements, the bituminous component is typically modified using smaller quantities of less expensive polymers such as atactic polypropylene (APP) or styrene-butadiene-styrene (SBS). A base sheet is generally reinforced with a fiberglass carrier (which is significantly less expensive than polyester) and is smooth surfaced. Its thickness typically ranges from 1.0 mm to 2.5 mm depending upon the job specifications.

Typically, cap and base sheet roofing systems are installed by first applying the base sheet to the substrate structure using either mechanical fasteners, hot mopping or cold adhesives, and then applying the cap sheets on top of the base sheets, with the seams of adjacent rolls in offset relation. The typical weight of a one square roll (1 roofing square equals 107.6 square feet) is between 70 pounds and 115 pounds, depending upon thickness of the membrane. Another type of waterproofing material used in roofing is the "underlayment". Underlayments are commonly utilized under shingle roofing material, metal roofing panels or tile roofing to provide waterproofing characteristics. They are widely used in residential applications, and may also be specifically designed for use in regions with colder climates, where ice-dam protection may be highly desirable. An ice-dam occurs when water flows down the roof, gets trapped on protruding edges and freezes, thus causing a build up of ice, which may cause cracking. Ice-dam protection is an issue in steep-slope applications, which tend to be mostly residential. Typically, underlayments are reinforced with fiberglass, but can also have no carrier. In the latter case, they simply comprise a coating of self-adhesive waterproofing compound on a polyolefinic film. Because they are typically used in steep slope roofing applications, underlayments must provide good traction for the safety of the roofer installing the material. Underlayments are typically installed by mechanically fastening the underlayment to the plywood substrate, or adhering the underlayment to the plywood substrate using a cold adhesive compound.

The most popular methods of installing waterproofing materials, and in particular roofing membrane are: (1) torching; (2) hot mopping; (3) cold adhesives; (4) mechanical fastening; and (5) self-adhesion. Typically, BUR sheets are applied using hot mopping. They can also be applied using cold-adhesives instead of hot asphalt. In this case the BUR sheet is set onto the substrate surface using cold adhesives and then, depending upon construction specifications, one or more additional BUR sheets may be applied onto the BUR sheet either by hot mopping or again using cold adhesives. Most APP-modified bitumen membranes are torch-applied. Most SBS-modified bitumen membranes are installed using hot mopping, torching or cold adhesives. As discussed above, underlayments are typically installed using mechanical fastening or cold adhesives.

Torch application entails heating the backside of the sheet with an open flame to melt the bituminous compound and using the molten bitumen to form a heat weld between the membrane and the substrate. Hot mopping entails mechanically spreading a layer of hot asphalt on the underlying substrate structure and then applying the membrane over the hot asphalt layer. The cold adhesives method involves using cold adhesives such as those described in U.S. Pat. No. 5,807,911 issued to Drieskens, et al. instead of hot asphalt to adhere the membrane to the substrate. Mechanical fastening entails fastening the material to the substrate with mechanical means such as using nails or staples.

Finally self-adhesion involves the use of a self-adhesive layer protected by a release liner in the roofing material. The adhesive material in a self-adhesive membrane serves to affix the membrane to the substrate surface, e.g. the roof deck, base sheet or underlayment, and typically includes modifiers and tackifying resins. The self-adhesive layer is usually protected by a release liner that is typically made of film (such as polypropylene, polyethylene or polyester) or kraft paper, and is treated with a release agent, for example, a silicone adhesive. The release liner is typically treated with the release agent on both the side that comes in contact with the self-adhesive compound and the exposed side. The release liner is applied to the self-adhesive compound to prevent sticking between adjacent sections of the roofing material and between the roofing and the packaging when the finished membrane is formed into rolls and stored or transported. Examples of such release films are disclosed in U.S. Pat. Nos. 5,143,766, 5,082,704, 5,932,352, and 5,756,214. U.S. Pat. No. 5,143,766, to Wenz et al., describes a self-adhesive bituminous roofing and sealing web with a cover sheet. U.S. Pat. Nos. 5,082,704 and 5,932,352, to Higgins, describe a release film. U.S. Pat. No. 5,756,214 to Waldron et al. describes a release film comprising polycarbonate-silicone-urethane resin. U.S. Pat. No. 5,756,214 to Katsura et al. describes a polymeric release film. The aforementioned patents are hereby incorporated by reference in their entirety. The self-adhesive compound used in the self-adhesive material is typically factory applied to the membrane and provides an adhesive layer having sufficient surface tack ("quick grab"), as well as adequate strength for adhering the membrane to the substrate surface.

A typical self-adhesive membrane includes a reinforcement or carrier saturated with modified bituminous compound that supports a modified bituminous compound layer positioned on top of the carrier sheet, and a self-adhesive modified bituminous compound layer positioned below the carrier sheet. A high strength polyolefinic film is then applied on to the exposed surface of the adhesive compound. However, self-adhering membranes, e.g. some underlayments, can also not include reinforcement. These types of materials comprise a release liner such as siliconized kraft paper onto which a bituminous adhesive compound is applied. Examples of self-adhesive roofing materials are disclosed in U.S. Pat. Nos. 4,386,981, 4,670,071, 4,757,652, 6,360,506, and 6,641,896. U.S. Pat. No. 4,386,981, to Clapperton, describes a self-adhesive underlayment used in an inverted fashion. In this case, to facilitate ventilation of any entrapped moisture, the non-adhesive surface of the material is placed adjacent to the roof surface, leaving the adhesive surface exposed so as to provide an adhesive surface for application of a weathering layer such as a gravel coating on top. U.S. Pat. No. 4,670,071, to Cooper et al., describes a self-adhesive membrane having discontinuous apertures so that bitumen adheres to the deck over an area of 10-50% of the total sheet, thus allowing water vapor passing through the sheet to escape laterally. U.S. Pat. No. 4,757,652, to Kalkanoglu, describes a self-adhering roofing product with a two-section release liner. U.S. Pat. No. 6,360,506, to Graae, teaches a bituminous roofing membrane and method of joining two roofing membranes with self-sticking strips. U.S. Pat. No. 6,641,896, to Fensel, describes a water resistant fire retardant underlayment sheet material having a self-adhesive bitumen layer. These patents also are incorporated by reference herein in their entirety.

Each of the available methods of application has some disadvantage. In the "torch" application technique, propane gas burners or torches are used to heat the back surface of the rolls. The flame has a temperature of 1,000 to 1,300 degrees Celsius and is directed towards the bottom surface of the sheet. Torching can thus be a dangerous undertaking due to the risk of fire caused by the utilization of a torch and similar equipment.

Hot mopping eliminates the use of the torch, but instead requires drums or cartons of hot asphalt. While it reduces the risk of fire, it creates additional operational problems. For example, hot mopping is labor intensive, especially in larger projects, and results in waste cartons with chemical residue, that must be disposed of properly. The disposal itself is also costly and labor-intensive. While this problem can be eliminated by using a hose to pump the asphalt to the roof, it is very difficult and dangerous to do so, especially in high-rise buildings installations.

Because cold adhesives generally come in buckets or pressurized spray can systems, their use also poses problems related to disposal of empty buckets or aerosol cans. Additionally, cold adhesives contain solvents that are not desirable from an environmental point of view and have a potential for the release of airborne pollutants.

Mechanical fastening is a slow and cumbersome process, which labor intensive and not always appropriate.

Self-adhesion has many advantages over the other methods. It permits a more simplified, safer and economical roof installation without compromising structural integrity and lap sealing capabilities. It also reduces labor and installation costs, and volatile organic compound and other emissions associated with the other methods of installation. Easy installation results from the fact that the self-adhesive compound is typically factory applied under controlled conditions prior to use in the field. The fact that the tacky self-adhesive is applied under controlled conditions, rather than in the field where there is a risk of contamination and variability in application techniques, allows for a consistently properly placed adhesive and enhanced adhesion to the underlying substrate. As a result, commercially available self-adhesive roofing materials are used in both commercial and residential applications.

While solving many of the problems of the installation techniques, self-adhesive materials do have drawbacks. These drawbacks are mainly due to their enhanced capacity for complete adhesion. For example, in comparison to mechanical attachment, attaching a self-adhesive base sheet to the underlying substrate (e.g. plywood, concrete or insulation) results in a fully adhered roofing system. This can be problematic because such full adhesion does not allow for ventilation of the roof or surface when necessary. Ventilation is important because it allows escape of moisture or condensation that can accumulate between the substrate surface and the roofing material due to, for example, thermal fluctuations (i.e. differences in temperatures between the outside and inside of a structure). A deck made of plywood that is fully adhered to the roofing membrane can be damaged over a period of time if this moisture is not allowed to escape. Furthermore, total adhesion of the roofing membrane to a plywood deck can be problematic when re-roofing is necessary, because there is a higher risk of damaging the underlying surface during roof tear-off. Proper ventilation is also necessary when the roofing membrane is applied to substrates other than plywood, such as concrete. Lightweight concretes, which are commonly used as part of the roof insulation, are prepared using ingredients such as Portland cement and water, and are poured onto the rooftop. Later roofing membranes are installed over the concrete surface that is formed. If a membrane that does not allow for proper ventilation is installed before the concrete is sufficiently cured, moisture and other gases may become entrapped in the concrete. This may result in blister formation on the membrane, and could eventually lead to rotting and decaying of both the concrete substrate and membrane. Similarly, full adhesion is undesirable when installing roofing membranes over insulations such as polyisocyanurate (PolyIso5), expanded polystyrene (EPS) or extruded polystyrene (XPS), due to the need for an escape route for the gases that are released from these types of insulations.

Although probably more pronounced with self-adhesive materials, the aforementioned problems regarding lack of ventilation may occur with any of the currently used methods of roofing membrane installation. The industry has attempted to address this problem in various ways. However, none to date have been entirely satisfactory. For example, in one such installation, a slip-sheet is first mechanically fastened at various points to the substrate and the modified bituminous membrane is then installed over the slip-sheet. This "spot attachment" of the slip sheet to the deck provides a path for the escape of gases, vapor and pressure, but it is also labor intensive and adds labor and material cost to the roofing system. Another type of installation designed to provide ventilation involves the use of an asphalt impregnated and coated glass fiber base sheet having mineral surfacing on the topside and coarse mineral granules on the bottom side. Upon installation these base sheets are not solidly attached and the coarse granular surface provides an open, porous channel in the horizontal plane beneath the membrane, which allows the lateral release of pressure. These types of installations do not involve self-adhesive materials and are typically carried out by hot mopping.

With respect to self-adhesive roofing membranes, the industry has introduced self-adhesive venting base sheets, which have been in use for several years. For example, ESHAVent, produced by ESHA Holding of Netherlands, #1000 ESHAVent sold by Malarkey Roofing Company of Oregon and SOPRA ESHAVent sold by Soprema Company of Canada are self-adhering venting base sheets presently sold in the U.S. These self-adhesive membranes have a perforated aluminum foil affixed to the self-adhesive compound so that part of the adhesive is covered by the foil. A release liner is then placed over the foil to protect the remaining adhesive area. The perforation covers approximately 30% of the total area of the aluminum foil, and materials such as polyolefinic film, fabrics and glass fiber, may be used instead of aluminum foil. Saint Gobain Technical Fibers of France manufactures glass fiber reinforcement with perforations or openings for use in this application. Upon installation these membranes adhere to the substrate in only approximately 30% of the area of the sheet (i.e., through the openings in the backing), because the self-adhesive compound in the remaining approximately 70% of the area of the sheet is blocked by the aluminum foil and cannot bond to the substrate. The self-adhering venting base sheets just described were originally developed and marketed for application under hot bitumen or torch-applied systems. The non-permeable layer of aluminum foil creates an effective vapor escape channel, thereby preventing roof blistering. Moreover, the aluminum foil acts as a heat shield to protect underlying roof insulation from the heat of a torch or hot bitumen, thereby eliminating the need for a coverboard over polyisocyanurate (PolyIso), expanded polystyrene (EPS) or extruded polystyrene (XPS). Such self-adhering venting base sheet membranes also have several other advantages. First, they eliminate the need for fasteners, resulting in cost savings for the applicator. Second, the absence of penetrating fasteners helps separate the roofing membrane system from the underlying insulation, thereby impeding thermal bridging which is frequent problem in temperature-controlled building such as cold-storage facilities. And finally, the spot-welded areas of the venting membrane are believed to act as shock absorbers, which compensate for the movement of the substrate (e.g. roof deck or insulation).

Though these types of self-adhering venting membranes have been used successfully for several years, they have several limitations. Because the membranes are usually 15 to 20 meters in length and are reinforced with fiberglass, the rolls into which they are formed for transport and storage become very rigid in cold conditions, especially their inner convolutions. This is exacerbated by the fact that the membranes have aluminum foil laminated to the self-adhesive compounds, which cause them to be very rigid to begin with, especially in cold weather conditions. This is a problem because unlike in torching or hot mopping installations, there is no heat involved in the installation of self-adhesive membranes, which can be used to render them more pliable in situ. Thus self-adhering membranes must be pliable enough to begin with so as to be able to upon application conform to the contours of the substrate and at intersections such as walls, flashings, roof penetrations, etc. If they are not flexible enough at the time of application, the adhesive bond between the membrane and the substrate may be affected and over time will cause the membrane to disengage from the substrate. The aluminum foil layer also adds additional raw material cost and manufacturing difficulties. For example, if the aluminum foil is not laminated properly to the self-adhesive compound during manufacture, it may disengage from the compound during packaging, transportation or field-application. Additionally, limitations in the processes of manufacture of the foil as well as lamination of the foil to the venting membrane limit the amount of perforation possible. For example, excessive perforation can lead to workability problems. One such problem is poor dimensional stability, which results in the inability to wind and then unwind the foil when laminating it to the self-adhesive compound during manufacture of the venting membrane. The area of perforation on the aluminum foil is directly proportional to the level of adhesive bond achieved between the membrane and the underlying substrate because adhesion occurs only through the perforated area. Thus process limitations which restrict the amount and the design of the open area limit the level and flexibility in level of adhesion which can be obtained.

SUMMARY OF THE INVENTION

The present invention provides novel self-adhesive construction materials for waterproofing, sealing and/or otherwise covering construction surfaces. These novel materials are adapted to partially adhere to the substrate on which they are applied and thus allow for ventilation. The novel materials comprise a surface covering material, which can be a waterproofing layer, a sealing layer, any other type of covering, or a layer having any combination, some combinations, or all of the combinations of such layers, having an adhesive component adapted for adhering the surface covering material to a substrate surface and a release liner for protecting the adhesive component, wherein a transfer chemical is applied in a desired pattern onto the surface of the release liner that is in contact with the adhesive component. Upon removal of the release liner from the covering material only the portion of the adhesive component that does not come into contact with the transfer agent adheres to the substrate. This results in partial adhesion, which allows for necessary venting of the substrate surface. The surface covering material may be a waterproofing membrane, sheet or tile. It can also be any other type of self-adhesive material for covering construction surfaces where partial adhesion to the substrate material would be advantageous, such as insulation, foundation sealing material, road construction material and waterproofing materials for bridges and tunnels.

In a particular embodiment, the present invention provides ventilating roofing materials that can be manufactured more easily and economically compared to ventilating roofing materials already on the market. The present invention eliminates the need for the perforated foil or film backing used in self-adhesive ventilating roofing materials presently on the market. As a result, the self-adhesive ventilating roofing materials have good workability characteristics and are more pliable, particularly at low temperatures and can be used at temperatures below 0 degrees Celsius. Moreover the amount of adhesion provided by the roofing material can be tailored to the particular needs of the application for which the material is to be used.

The self-adhesive roofing materials of the present invention comprise a waterproofing layer having an adhesive component adapted for adhering the material to a substrate and a release liner for protecting the adhesive component, wherein a transfer chemical is applied in a desired pattern to the surface of the release liner that comes into contact with the adhesive component. The transfer chemical transfers to and remains on the adhesive surface, rendering the portion of the self-adhesive compound it comes into contact with non adhesive, such that when the release liner is removed from the waterproofing material upon installation only the portion of the adhesive material that is not covered by the transfer chemical is capable of adhering to the substrate. As a result, when the roofing material is applied to the substrate it only partially adheres to the surface, e.g. is "spot-attached". This "spot attachment" provides a route for the escape of latent moisture or pressure that may build up between the material and the substrate. Because they do not require perforated foil or film, the self-adhesive ventilating roofing materials of the present invention are also very pliable, easy to work with, cost-effective, and manufacturing process-friendly.

The waterproofing material can be any roofing material in any form suitable for roofing that can be applied by self-adhesion, including modified and unmodified bitumen roofing materials. The self-adhered ventilating roofing materials of the present invention may be a cap sheet, a base sheet, a tile underlayment or a metal underlayment. It may be in the form of a membrane or shingle or other form suitable for roofing. Both inner surfaces of the removable release liner are preferably treated with a release agent, such as silicone, prior to application of the transfer chemical material to the surface that comes into contact with the adhesive material. The adhesion level of the material may be varied by varying the pattern or area covered by the transfer chemical. The transfer chemical can be applied by known printing methods and the extent and design or pattern of the printed area may vary depending upon the adhesion requirements of the particular application.

In one embodiment the self-adhesive ventilating roofing material comprises: a carrier sheet having a front side and a back side; a first bituminous layer having an upper surface and a lower surface, wherein the bituminous layer is attached on the lower surface to the front side of the carrier sheet, a second bituminous layer, having an upper surface and a lower surface, wherein said second bituminous layer is a bituminous adhesive layer, wherein the bituminous adhesive layer is attached on the upper surface to the back side of the carrier sheet; and a removable release liner having an inner surface and an outer surface, wherein said release liner is removably attached on the inner surface to the lower surface of the bituminous adhesive layer, said inner surface having a transfer chemical material applied thereon to cover a desired area of the inner surface; wherein upon removal of the liner and application of the material to the substrate, the bituminous adhesive layer partially adheres to the substrate. The carrier sheet may be made of polyester, glass fiber or a combination thereof, and is saturated and coated with an unmodified or a polymer modified bituminous coating on the upper side of the reinforcement and a self-adhesive bituminous coating on the bottom side. In another embodiment, the present invention provides a self-adhesive ventilating roofing material, useful as an underlayment material for use under tile or metal roofing. The underlayment comprises an unmodified bituminous or a polymer modified bituminous membrane having an upper weathering surface and a lower adhesive surface; and a removable release liner having an inner surface and an outer surface, wherein said release liner is removably attached on the inner surface to the lower surface of the bituminous adhesive layer, said inner surface having a transfer chemical material applied thereon to cover a desired area of the inner surface; wherein upon removal of the liner and application of the material to the substrate, the bituminous adhesive layer partially adheres to the substrate. A suitable surfacing agent such as fabric material or roofing granules may be applied to the weathering surface to provide anti-skid properties and high temperature resistance. In the case of a metal underlayment it is preferable to include a fabric material as the surfacing agent to provide high temperature resistance.

Other types of self-adhesive construction materials for covering substrate surfaces can also be provided with the liner described in the present invention if partial adhesion to the substrate is necessary. Such materials could include insulation, foundation sealing material, road construction material and waterproofing materials for bridges and tunnels.

The present invention also provides a method of manufacturing the self-adhesive construction surface covering materials of the present invention comprising protecting the adhesive layer of a self-adhesive construction surface covering material with a removable release liner that is removably attached to the exposed adhesive surface of the adhesive layer, said release liner having a transfer chemical material applied to the surface that is in contact with adhesive layer so that upon removal of the liner and application of the material to the substrate, the bituminous adhesive layer partially adheres to the substrate because the portions of the adhesive layer coming into contact with the transfer chemical have been rendered non adhesive.

Further aspects, features and advantages of the present invention will become apparent to those of ordinary skill in the art upon reading and understanding the following detailed description.

DETAILED DESCRIPTION

The invention will be illustrated and described in more detail with particular reference to the roofing materials shown in the accompanying figures. In one preferred embodiment, the ventilating roofing membrane is an APP dual compound composition constructed of a first APP modified bituminous layer on the front side of the carrier sheet and a second self-adhesive bituminous layer on the back side of the carrier sheet. The second bituminous layer is very adherent and provides excellent adhesion of the membrane to the underlying surface. As used herein, a self-adhesive bitumen compound or layer is a bitumen comprising tackifying resins, which render the bitumen sticky.

Figure 1:
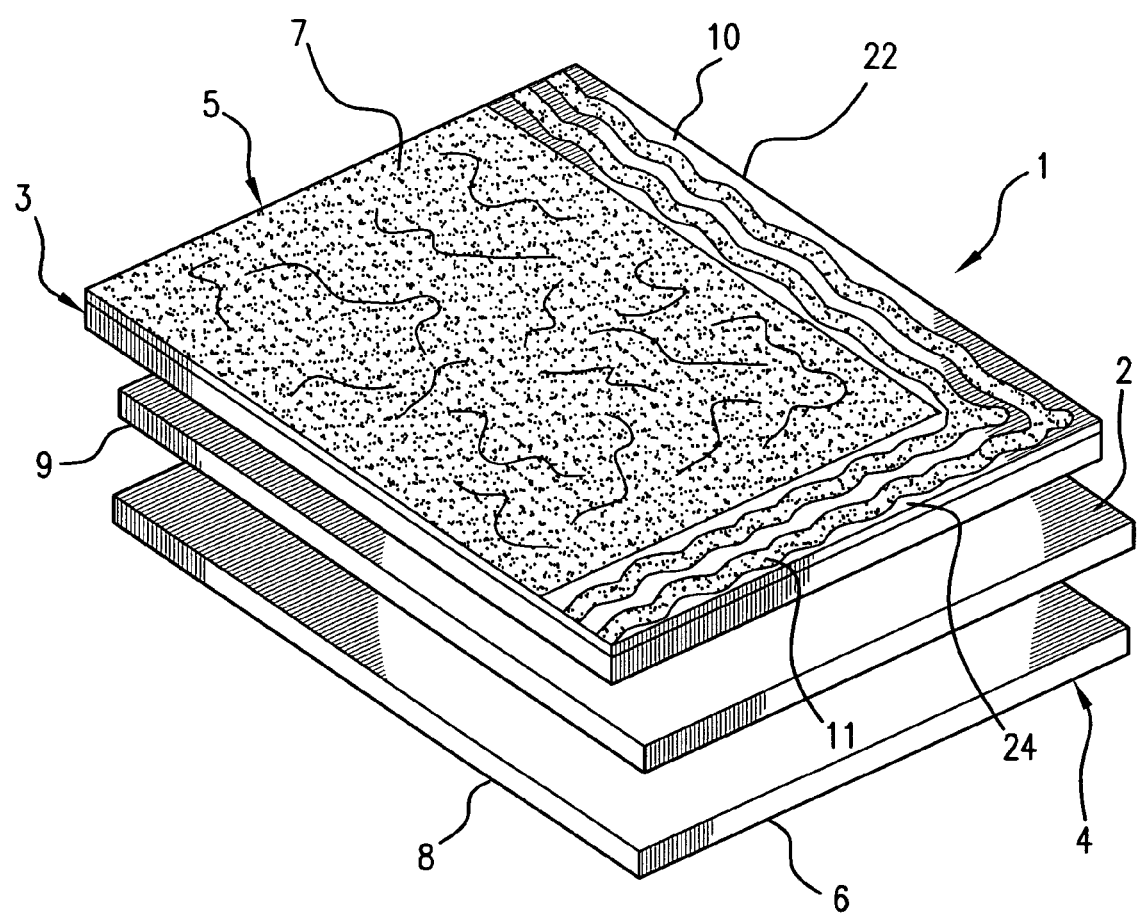
FIG. 1 is an exploded view of the ventilating roofing membrane.

Referring now to the drawings, FIG. 1 illustrates one example of a self-adhesive modified bituminous ventilating roofing membrane in accordance with the present invention. The composite sheet 1 is made with modified bitumen coatings and a reinforcing carrier sheet 2. Specifically, composite sheet 1 includes a reinforcing carrier 2 sandwiched between top and bottom layers, 3 and 4, respectively, of modified bitumen coatings, which form oppositely exposed upper and lower surfaces, 5 and 6, respectively, of the composite sheet 1. The bottom layer 4 has a polymer-modified bituminous compound that constitutes a non-weathering surface adapted to be secured to the underlying surface. The top layer 3 is an APP compound (described in detail later in the description) and the bottom layer 4 is a separate, but compatible, self-adhesive compound (also described in detail later in the description). Between the top and bottom layers, 3 and 4 respectively, is a reinforcing carrier sheet core 2, preferably made of a fiberglass or polyester substrate. Alternatively, the reinforcing carrier sheet 2 may be formed of a composite material that is a combination of both polyester and fiberglass creating a stronger reinforcement carrier sheet 2. As will become hereinafter apparent, the lower exposed surface 6 of the bottom layer 4 is a non-weathering surface adapted to be adhered directly to the underlying surface. Surfacing agents 7, such as granules, talc, polyolefinic film or sand for cap sheets and base sheets, fabric materials or polyolefinic film for metal underlayments, or mineral granules for tile underlayments, are applied to the upper surface of the top bituminous coating layer 3 to impart weathering, high temperature resistant properties and skid resistant characteristics.

The top APP compound layer 3 of the composite sheet 1 can either be smooth surfaced or surfaced with a protective layer of surfacing agents 7, such as granules, as shown in FIG. 1 This upper surface 5 constitutes a surface exposed to weather conditions or possibly to other membranes. The top APP compound layer 3 of the present invention is characterized in that it comprises a mixture of one or more of the following ingredients: a mixture of polypropylene modifiers such as isotactic polypropylene, ethylene-propylene copolymer and atactic polypropylene, mineral stabilizers such as limestone, talc, fly ash, volcanic ash, graphite, carbon black, silica or china clay, and asphalt. The bottom adhesive layer 4 of the dual-compound bituminous coating is an aggressive adhesive layer that is applied on the backside 9 of the carrier sheet 2. The bottom adhesive layer 4 should possess a reasonable shelf life and excellent adhesion characteristics and have sufficient surface tack for rooftop installation but yet should not be too sticky that one cannot remove the release liner 8 at high temperatures. The bottom adhesive layer 4 generally comprises a mixture of the one or more of the following ingredients: styrene-butadiene-styrene copolymer, styrene-isoprene-styrene copolymer, and hydrocarbon tackifying resins, mineral stabilizers such as limestone or talc, and asphalt. Such a mixture provides adhesive properties to the bottom adhesive layer, e.g. at room temperature. In a further example embodiment, an adhesive, which is a pressure-sensitive adhesive, may be applied to the bottom adhesive layer (not shown).

Positioned on the lower exposed surface 6 of the bottom adhesive bituminous layer 4 is a release liner 8, preferably silicone treated polypropylene, polyethylene or polyester. The release liner 8 is removably adhered to the self-adhesive compound bottom layer 4 to protect the adhesive properties during production, transportation and storage of the composite sheets or membranes. It is typically a polyester, polypropylene or polyethylene film that is 25 to 70 micron in thickness. Release liners are well known in the art, and may also be made of other plastics, latex, acrylic, film, paper, such as kraft paper, or a composite of paper and film. Preferably, the release liner is coated with a release agent that resists permanent bonding with the adhesive, e.g. silicone. Preferably, it is siliconized on the surface that contacts the self-adhesive compound bottom layer 4 and most preferably on both surfaces. The release liner 8 is removed just prior to use of the composite sheet 1 to allow the adhesive portion to be adhered to a roof surface or other underlying surface. All that is required at the jobsite is for the applicator to (1) unroll and position the composite sheet, (2) fold one-half of the rolled out membrane back and strip away the release liner 8, (3) place the now-exposed adhesive bottom layer 4 onto the roof, (4) apply pressure, using, for example, a metal roller that is at least 80 lbs in weight, and (5) fold the other half of the rolled out membrane, remove the release liner 8, and adhere this section to the underlying surface as described above. Also removed at the time of roof covering installation are the selvage release film 10 and the end lap film 11.

In order to provide for partial adhesion, a transfer chemical is applied to the release liner in a desired pattern on the side that comes into contact with the adhesive portion of the composite sheet with a transfer chemical. This can be accomplished by known printing methods. The chemical transfers to the adhesive portion of the composite sheet and thus renders the portion it comes into contact with non-adhesive. Upon installation only the part of the adhesive layer that has not come into contact with the transfer chemical adheres to the substrate surface and this results in partial adhesion of the material to the surface. As used herein, partial adhesion is defined as an adhesion of a portion of an adhesive component to a substrate surface such that the non adhesive portion allows ventilation of the substrate surface, i.e. permits the escape of moisture or heat from between the substrate surface and the covering material, and the portion of adhesion is sufficient to ensure that the material adheres to the substrate surface in accordance with construction specifications, e.g., provides waterproofing, sealing and/or covering. The portion of adhesion is generally over 30% but less than 100%, preferably 40-80%, and most preferably about 50%. The percentage of adhesion is measured by subtracting the area of non adhesion from the total surface area. The percentage of non-adhesion is achieved by patterning a desired percentage of a surface area of a removably attached release liner with a transfer chemical such that when the release liner is applied on the adhesive surface, the transfer chemical adheres to the adhesive layer. Upon removal of the liner, the area of the adhesive component on which the chemical was in contact is rendered non-adhesive. Any suitable pattern covering the desired area may be used, however a pattern of circles is preferred. In a preferred embodiment, the area covered by the printed pattern is about 50%. In another embodiment, it is greater than 50%. In yet another embodiment, it is less than 50%. As used herein a transfer chemical material for printing on a release liner can be any suitable chemical that transfers, i.e., adheres to the adhesive surface upon removal of the release liner and renders the area to which the transfer chemical adheres non-adhesive. The transfer chemical may also be termed an adhesive-blocking transfer chemical. Such chemicals are readily available and known to those of skill in the art. Examples of transfer chemicals useful in this invention are lacquers and resinous varnishes. Chemicals that are similar to lacquer, including but not limited to paint and ink, may also be used as a transfer chemical for printing on a release liner. Other suitable transfer chemicals that could be used include talc or chalk. Since such lacquer could potentially adhere to other sections of the release liner itself and come loose during unwinding of the release liner at the time of manufacture of the ventilating sheet, it is preferable to silicone treat both surfaces of the release liner. Several companies that specialize in silicone treatment of release liners can be employed to produce the printed liner.

Figure 2:
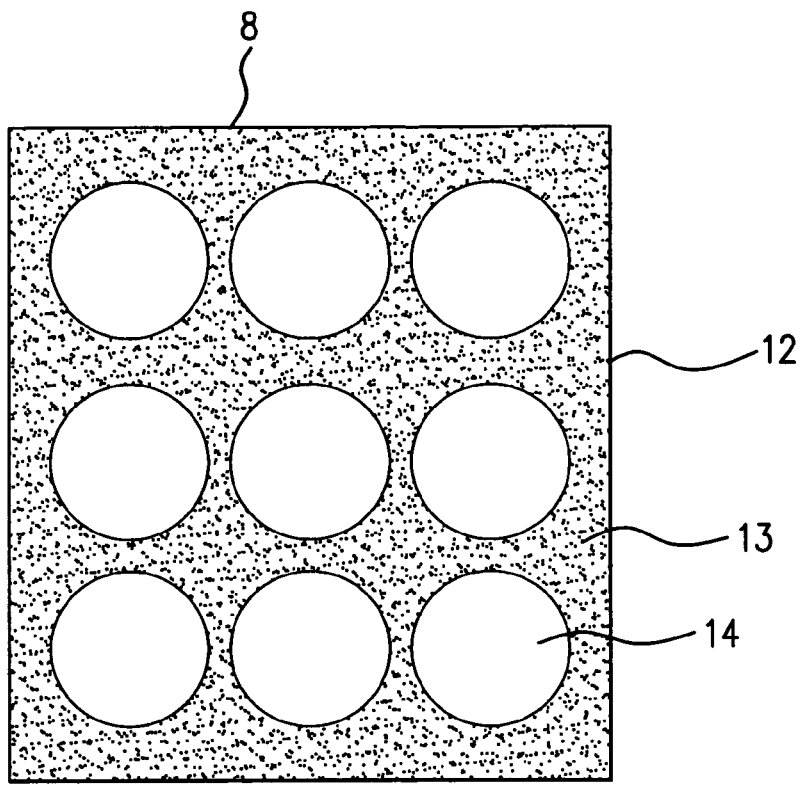
FIG. 2 is a view of the siliconized surface of the release liner that is adapted to come in contact with the self-adhesive compound.

FIG. 2 shows the siliconized surface 12 of the release liner 8 that is adapted to come in contact with the self-adhesive compound. The release liner has an inner surface and an outer surface, with the inner surface designed to come into contact with the self-adhesive compound, and therefore, is treated with a release agent such as silicone. As an example embodiment, a transfer lacquer 13 was selected. Such lacquer was printed on the siliconized surface of the release liner in a desired pattern, taking into account that the self-adhesive compound that comes into contact will be rendered non-sticky in this pattern. It is desirable to have adhesion in approximately 50% of the area of the membrane; as such the lacquer was applied in a manner that the non-lacquer printed area 14 represented the area where the self-adhesive compound will adhere to the substrate.

Figure 3:
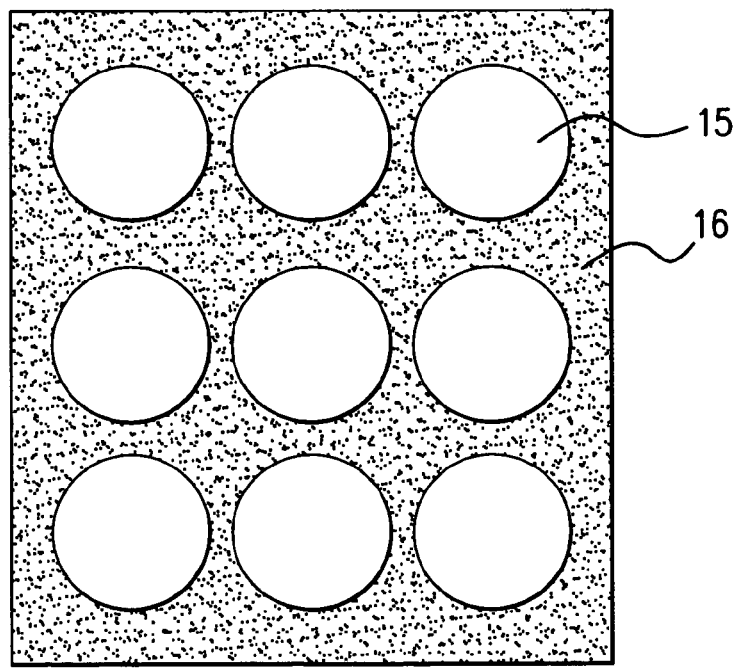
FIG. 3 is a view of the self-adhesive layer of the ventilating roofing membrane upon removal of the release liner.

FIG. 3 gives a view of the self-adhesive layer of the ventilating roofing membrane upon removal of the release liner. Self-adhesive compound comes into contact with the substrate through the non-lacquer printed area 15, represented in the form of holes or perforations of 25 mm diameter. In other areas the transfer lacquer 16 is present so that it transfers to the self-adhesive compound during removal of the release liner at the time of membrane installation and therefore renders some portions of the self-adhesive compound not sticky.

In one embodiment of the present invention, the upper layer may be an unmodified or modified bituminous compound, and the bottom layer may be a bituminous adhesive compound. Alternatively, both the upper and bottom layers may comprise the same bituminous adhesive compound, wherein the upper layer is modified or both the upper and bottom layers are modified. In another example embodiment, the material may be a single bituminous adhesive layer. In another embodiment, the material may be a shingle, rather than a membrane. In all of the aforementioned embodiments, the adhesive bituminous layer that is applied to a surface has a removably adhered release liner attached on its bottom surface, as described above. The upper "waterproofing" bituminous layer, which does not adhere to the substrate surface, may be modified to enhance the resulting membrane properties as discussed below.

In another preferred embodiment, the inventive ventilating roofing membrane is a sheet for use as an underlayment for tile roofing. The tile underlayment includes a first bituminous coating portion and a second self-adhesive bituminous coating portion, which has a transfer chemical treated release liner as described above removably attached thereto. The first bituminous coating portion may be based on a polymer modified or unmodified bituminous compound. The first bituminous coating portion may also be the same as the second self-adhesive bituminous coating. Polymer modified bituminous compounds may use atactic polypropylene (APP), styrene-butadiene-styrene (SBS), styrene-ethylene-butadiene-styrene (SEBS), thermoplastic polyolefin (TPO), amorphous poly alpha olefin (APAO) or polyethylene (PE) as the primary modifier. These two components may be present over a wide compositional range but a minimum thickness of 0.30 mm of the second coating portion is preferred to achieve the desired adhesion performance. The carrier sheet comprises polyester or fiberglass reinforcement and is preferably surfaced with mineral granules or fabric material on the upper surface to provide anti-skid properties as well as good weatherability.

Yet another preferred embodiment of the ventilating roofing membrane is a sheet adapted to be used as an underlayment for metal roofing. Such an inventive metal underlayment includes a first bituminous coating portion and a second self-adhesive bituminous coating portion, which has a transfer chemical treated release liner as described above removably attached thereto. The first bituminous coating portion may be based on a polymer modified or unmodified bituminous compound. The first bituminous coating portion may also be the same as the second self-adhesive bituminous coating, i.e., the first and second bituminous coating/layer may both be polymer modified or unmodified. Polymer modified bituminous compounds may use atactic polypropylene (APP), styrene-butadiene-styrene (SBS), styrene-ethylene-butadiene-styrene (SEBS), thermoplastic polyolefin (TPO), amorphous poly alpha olefin (APAO) or polyethylene (PE) as the primary modifier. These two components may be present over a wide compositional range but a minimum thickness of 0.30 mm of the second coating portion is preferred to achieve the desired adhesion performance. The carrier sheet comprises polyester or fiberglass reinforcement and is surfaced with fabric material or polyolefinic film on the upper surface to provide a non-abrasive surface in addition to anti-skid characteristics.

Another preferred embodiment of the ventilating roofing membrane is a styrene-butadiene-styrene (SBS) dual compound composition constructed of a first SBS modified bituminous layer on the front side of the carrier sheet and a second self-adhesive bituminous layer on the back side of the carrier sheet, the second self-adhesive bituminous layer having a transfer chemical treated release liner as discussed above removably attached thereto. The second bituminous layer is very adherent and provides excellent adhesion of the membrane to the underlying surface. The top SBS compound layer 3 of the present invention is characterized in that it comprises a mixture of one or more of the following: styrene-butadiene-styrene copolymer, mineral stabilizers such as limestone, talc, fly ash, volcanic ash, graphite, carbon black, silica or china clay, and asphalt.

Yet another preferred embodiment is a ventilating roofing membrane is an Styrene-Ethylene-Butadiene-Styrene (SEBS) dual compound composition constructed of a first SEBS modified bituminous layer on the front side of the carrier sheet and a second self-adhesive bituminous layer on the back side of the carrier sheet, wherein the second self-adhesive bituminous layer has a transfer chemical treated release liner as discussed above removably attached thereto. The second bituminous layer is very adherent and provides excellent adhesion of the membrane to the underlying surface. The top SEBS compound layer 3 of the present invention is characterized in that it comprises a mixture of one or more of the following ingredients: styrene-ethylene-butadiene-styrene copolymer, mineral stabilizers such as limestone, talc, fly ash, volcanic ash, graphite, carbon black, silica or china clay, and asphalt.

In another preferred embodiment, the presented ventilating roofing membrane is a thermoplastic polyolefin (TPO) dual compound composition constructed of a first TPO modified bituminous layer on the front side of the carrier sheet and a second self-adhesive bituminous layer on the back side of the carrier sheet, which has a transfer chemical treated release liner removably as discussed above attached thereto. The second bituminous layer is very adherent and provides excellent adhesion of the membrane to the underlying surface. The top TPO compound layer 3 of the present invention is characterized in that it comprises a mixture of one or more of the following ingredients: thermoplastic polyolefin (TPO), mineral stabilizers such as limestone, talc, fly ash, volcanic ash, graphite, carbon black, silica or china clay, and asphalt.

In another preferred embodiment, the presented ventilating roofing membrane is a Polyethylene (PE) dual compound composition constructed of a first PE modified bituminous layer on the front side of the carrier sheet and a second self-adhesive bituminous layer on the back side of the carrier sheet, which has a transfer chemical treated release liner as described above removably attached thereto. The second bituminous layer is very adherent and provides excellent adhesion of the membrane to the underlying surface. The top PE compound layer 3 of the present invention is characterized in that it comprises a mixture of one or more of the following ingredients: Polyethylene (PE), preferably film grade, mineral stabilizers such as limestone, talc, fly ash, volcanic ash, graphite, carbon black, silica or china clay, and asphalt.

It is another preferred embodiment to present a ventilating roofing membrane is an Amorphous Poly Alpha Olefin (APAO) dual compound composition constructed of a first APAO modified bituminous layer on the front side of the carrier sheet and a second self-adhesive bituminous layer on the back side of the carrier sheet, wherein the second self-adhesive bituminous layer has a transfer chemical treated release liner as described above removably attached thereto. The second bituminous layer is very adherent and provides excellent adhesion of the membrane to the underlying surface. The top APAO compound layer 3 of the present invention is characterized in that it comprises a mixture of one or more of the following ingredients: Amorphous Poly Alpha Olefin (APAO), mineral stabilizers such as limestone, talc, fly ash, volcanic ash, graphite, carbon black, silica or china clay, and asphalt.

One other preferred embodiment of the ventilating roofing membrane is a dual compound composition constructed of a first unmodified bituminous layer on the front side of the carrier sheet and a second self-adhesive bituminous layer on the back side of the carrier sheet, wherein the second self-adhesive bituminous layer has a transfer chemical treated release liner as described above removably attached thereto. The second bituminous layer is very adherent and provides excellent adhesion of the membrane to the underlying surface. The top unmodified compound layer 3 of the present invention is characterized in that it comprises a mixture of one or more of the following ingredients: mineral stabilizers such as limestone, talc, fly ash, volcanic ash, graphite, carbon black, silica or china clay, and asphalt, preferably oxidized.

Still another preferred embodiment of the ventilating roofing membrane is a single compound composition constructed of a first self-adhesive bituminous layer on the front side of the carrier sheet and a second self-adhesive bituminous layer on the back side of the carrier sheet. The second self-adhesive bituminous layer has a transfer chemical treated release liner as described above removably attached thereto. The first and second bituminous layers are very adherent and provide excellent adhesion of the membrane to the underlying surface. The top adhesive bituminous layer provides a strong adhesion of surfacing agents. The top self-adhesive compound layer 3 of the present invention is characterized in that it comprises a mixture of one or more of the following: styrene-butadiene-styrene copolymer, styrene-isoprene-styrene copolymer, hydrocarbon tackifying resins, mineral stabilizers such as limestone or talc, and asphalt.

In all of the above-discussed embodiments, in order to achieve fire ratings as classified by Underwriters' Laboratories (UL), special fire retardant additives may be used as filler material in the top compound layer. Typical fire retardants employed include calcium borate, magnesium borate, a mixture of antimony tri-oxide and deca bromo diphenyl oxide, etc. These are used as replacement for existing filler material such as limestone, talc, fly ash, volcanic ash, graphite, carbon black, silica or china clay or used in conjunction with these filler materials.

Figure 4:
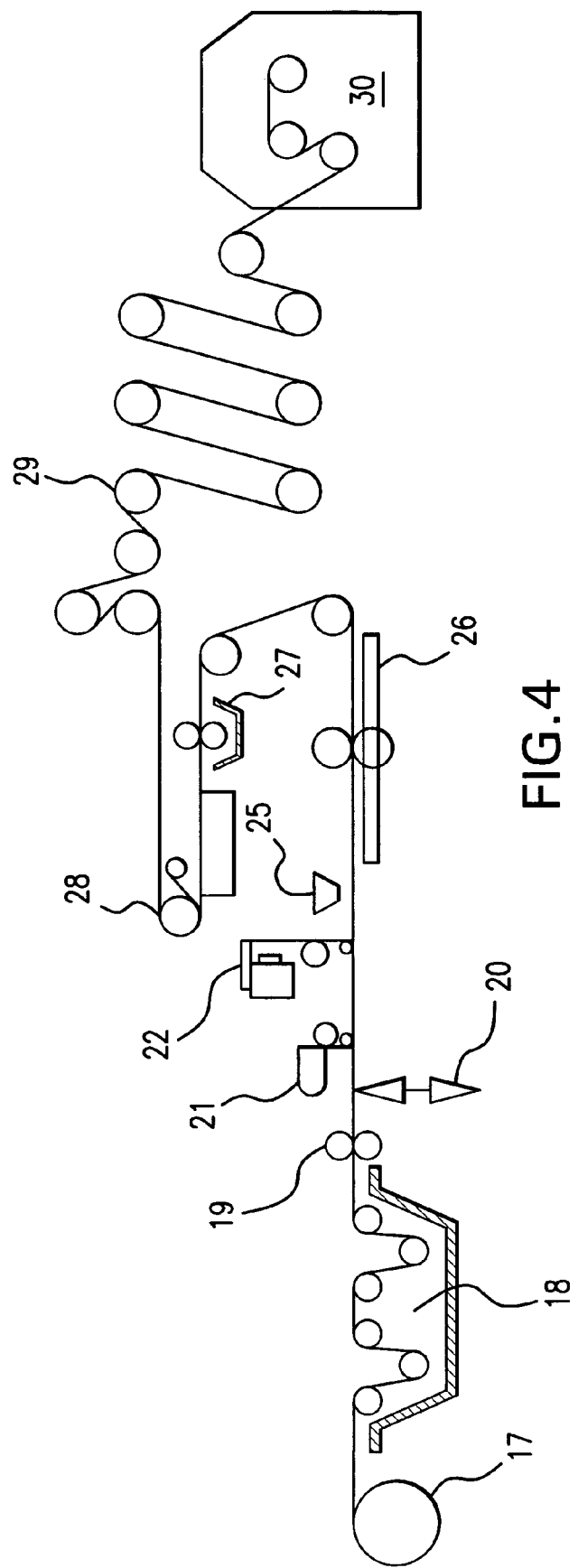
FIG. 4 is a view of the manufacturing process of the ventilating roofing membrane.

FIG. 4 illustrates the process of manufacture of a dual compound modified bitumen composite sheet 1. One or more reinforcement carrier sheets 2, which may be polyester, fiberglass, or a polyester/fiberglass combination, is unwound from a mat unwinding station 17, and saturated with the APP modified bitumen compound on the top layer 3 in the saturation tank 18. Coating thickness is controlled, e.g., using calender rolls 19 immediately after the saturated carrier sheet 2 comes out of the saturation tank 18. For this invention, compound from the carrier sheet back side 9 is scraped off using a scraper blade 20 in order to facilitate application of the self-adhesive compound bottom layer 4 on the carrier back side 9 of the carrier sheet 2 during a later stage in the manufacturing process. This results in a reinforcement that has bituminous coating on the upper side and is uncoated on the bottom side. As discussed infra, later in the process, bituminous adhesive coating is applied on the bottom side of the reinforcement. Following this application, in the case of granule-surfaced products, a siliconized polyester film tape, called selvage release film 10, that is approximately 3 to 4 inches in width, is placed along the length of the roll on one side of the composite sheet 1 using a selvage film applicator 21, forming a side lap 22. This allows for overlapping one roll over another widthwise. Immediately following this application, a siliconized polyester end lap film 11, which is approximately 4 to 6 inches in width, is positioned across the width of the sheet using an applicator device 23 at regular intervals to provide a granule-free end lap 24. Examples of end lap protection of a roll of roofing membrane are provided in U.S. Pat. Nos. 5,766,729; 5,843,522; and 5,964,946, which are incorporated by reference herein in their entirety. The protected end lap 24 feature allows a granule-free surface at the end of each roll and facilitates easy installation when overlapping one roll over another lengthwise. Directly following these applications, surfacing agents 7 are applied using the surfacing applicator 25. After the surfacing application process, the composite sheet 1 undergoes cooling by traveling on a chilled water bath 26 and over cooling drums and typically is cooled to about 95 degrees Celsius. If granules are applied as surfacing agents 7, the roofing composite sheet 1 is continued through the production line over granular press rollers in order to embed the granules into the hot bituminous compound top layer 3. After traveling through a series of turns and gears, the composite sheet 1 is inverted such that the upper-exposed surface of the composite sheet 1 is now on the bottom side, and at about 160 degrees Celsius, the self-adhesive compound bottom layer 4 is applied at the coating vat 27. Following the self-adhesive bottom layer 4 application, the composite sheet 1 travels over a cooling belt to permit cooling of the self-adhesive compound. A transfer chemical treated release liner 8 is applied to the self-adhesive compound bottom layer 4 using the release liner applicator 28. Then, the composite sheet 1 travels through the accumulator 29 to the winder 30 where it is cut to the required length and wound into rolls.

While the invention has been described in detail with respect to roofing materials, one of ordinary skill in the art will appreciate that the teachings could be applied to other self-adhesive construction materials where advantageous and suitable by using the transfer chemical treated release liner described herein as the protective covering for the adhesive material. Such materials could include insulation, foundation sealing material, road construction material and waterproofing materials for bridges and tunnels.

What is claimed is:

1. A self-adhesive construction material for waterproofing, sealing and/or covering a construction surface comprising:
    a material adapted for waterproofing, sealing and/or covering a construction surface, said material having an upper and lower surface;
    an adhesive component for adhering the lower surface of the material to the construction surface;
    a release liner for protecting said adhesive component having an outer surface and an inner surface, wherein said inner surface is removably attached to the adhesive component;
    wherein the inner surface of the release liner includes a transfer chemical, printed thereon to form a transfer chemical pattern, the transfer chemical pattern coupled to the adhesive layer and rendering it non adhesive, thereby forming a plurality of ventilation paths, said transfer chemical being releasably attached to the release liner in such a way that upon removal of the release liner from the construction material only a portion of the adhesive component adheres to the construction substrate.

2. The self-adhesive construction material of claim 1, wherein the material is a roofing material.

3. The self-adhesive construction material of claim 1, wherein the material is a foundation sealing material.

4. The self-adhesive construction material of claim 1, wherein the material is a wall-insulation material.

5. The self-adhesive construction material of claim 1, wherein the material is a road construction material.

6. The self-adhesive construction material of claim 1, wherein the material is a waterproofing material for a bridge or a tunnel.

7. The self-adhesive construction material of claim 1, wherein the transfer chemical is printed on about less than 70% of the surface of the release liner.

8. The self-adhesive construction material of claim 1, wherein the transfer chemical is printed on about 20% to 60% of the surface of the release liner.

9. The self-adhesive construction material of claim 1, wherein the transfer chemical is printed on about 50% of the surface of the release liner.

10. The self-adhesive construction material of claim 1, wherein the material adapted for waterproofing, sealing and/or covering the construction surface is a single bituminous layer.

11. The self-adhesive construction material of claim 1, wherein the material adapted for waterproofing, sealing and/or covering the construction surface further comprises two bituminous layers, a first layer attached to a top surface of a carrier sheet and a second layer attached to a bottom surface of a carrier sheet.

12. The self-adhesive construction material of claim 10, wherein the bituminous layer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or polyethylene (PE).

13. The self-adhesive construction material of claim 11, wherein the first bituminous layer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or polyethylene (PE).

14. The self-adhesive construction material of claim 1, wherein the portion of the adhesive component that adheres to the construction substrate is greater than 30% of the adhesive component.

15. The self-adhesive construction material of claim 1, wherein the portion of the adhesive component that adheres to the construction substrate is about 40% to 80% of the adhesive component.

16. The self-adhesive construction material of claim 1, wherein the portion of the adhesive component that adheres to the construction substrate is about 50% of the adhesive component.

17. A self-adhesive ventilating roofing material, said material comprising:
   a bituminous adhesive layer having an upper surface and a lower surface; and
   a removable release liner having an inner surface and an outer surface, wherein said liner is removably attached on the inner surface to the lower surface of the bituminous adhesive layer, said inner surface having a transfer chemical material printed thereon to form a transfer chemical pattern on the inner surface, the transfer chemical material being coupled to the bituminous adhesive layer according to the pattern, the pattern forming a plurality of lateral ventilation paths extending along the lower surface of the bituminous adhesive layer;
   wherein upon removal of the release liner and application of the roofing material to a substrate, the transfer chemical remains coupled to bituminous adhesive layer such that the bituminous adhesive layer provides partial adhesion to the substrate, the pattern being selected to provide ventilation between the roofing material and the substrate.

18. The self-adhesive ventilating roofing material of claim 17, wherein the bituminous adhesive layer is a polymer modified bituminous layer.

19. The self-adhesive ventilating roofing material of claim 18, wherein the polymer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or polyethylene (PE).

20. The self-adhesive ventilating roofing material of claim 17, wherein the bituminous adhesive layer is an unmodified bituminous layer.

21. The self-adhesive ventilating roofing material of claim 17, wherein the inner surface and the outer surface of the removable reinforced release liner are each treated with silicone prior to the printing of the transfer chemical material on the inner surface.

22. The self-adhesive ventilating roofing material of claim 17, wherein the release liner is reinforced.

23. The self-adhesive ventilating roofing material of claim 17, wherein the transfer chemical pattern has a desired area selected to provide a partial adhesion of greater than 30% adhesion.

24. The self-adhesive ventilating roofing material of claim 17, wherein the transfer chemical pattern has a desired area selected to provide a partial adhesion of about 40% to 80% adhesion.

25. The self-adhesive ventilating roofing material of claim 17, wherein the transfer chemical pattern has a desired area selected to provide a partial adhesion of about 50% adhesion.

26. The self-adhesive ventilating roofing material of claim 17, wherein the bituminous adhesive layer further comprises a fire retardant as a filler.

27. The self-adhesive ventilating roofing material of claim 17, wherein the bituminous layer further comprises a surfacing agent.

28. The self-adhesive ventilating roofing material of claim 17, wherein the surfacing agent is a mineral granule.

29. The self-adhesive ventilating roofing material of claim 17, wherein the surfacing agent is a fabric material.

30. The self-adhesive ventilating roofing material of claim 17, wherein the surfacing agent is a polyolefinic film.

31. The self-adhesive ventilating roofing material of claim 17, wherein the material is a membrane.

32. The self-adhesive ventilating roofing material of claim 17, wherein the material is a shingle.

33. The self-adhesive ventilating roofing material of claim 17 that is a
   a) cap sheet;
   b) base sheet;
   c) tile underlayment; or
   d) metal underlayment.

34. A self-adhesive ventilating construction material for waterproofing, sealing and/or covering a construction surface comprising:
   a material adapted for waterproofing, sealing and/or covering a construction surface, said material having an upper and lower surface;
   an adhesive component for adhering the lower surface of the material to the construction surface;
   a release liner for protecting said adhesive component having an outer surface and an inner surface, wherein said inner surface is removably attached to the adhesive component;
   wherein the inner surface of the release liner includes a transfer chemical, printed thereon to form a transfer chemical pattern having a plurality of interconnected paths extending along the adhesive component, the chemical transfer pattern adapted to be transferred onto the adhesive layer and to render the adhesive component non-adhesive in areas where the transfer chemical has been transferred, the transfer chemical being attached to the release liner in such a way that upon removal of the release liner from the construction material only a portion of the adhesive component outside the transfer chemical pattern adheres to the construction substrate.

35. The ventilating construction material of claim 34, wherein the plurality of interconnected paths forms a plurality of interconnected ventilation paths when the lower surface of the material is adhered to the construction surface.

36. A self-adhesive ventilating roofing material comprising:
   a carrier sheet having a front side and a back side;
   a first bituminous layer having an upper surface and a lower surface, wherein the bituminous layer is attached on the lower surface to the front side of the carrier sheet,
   a second bituminous layer, having an upper surface and a lower surface, wherein said second bituminous layer is a bituminous adhesive layer, wherein the bituminous adhesive layer is attached on the upper surface to the back side of the carrier sheet; and
   a removable release liner having an inner surface and an outer surface, wherein said release liner is removably attached to the lower surface of the bituminous adhesive layer, said inner surface having a transfer chemical material printed thereon to form a transfer chemical pattern on the inner surface, the transfer chemical material being coupled to the adhesive layer according to the pattern, the pattern forming a plurality of lateral ventilation paths extending along the lower surface of the bituminous adhesive layer;

wherein upon removal of the release liner and application of the roofing material to a substrate, the transfer chemical remains coupled to the adhesive layer such that partial adhesion to the substrate results, the pattern being selected to provide ventilation between the roofing material and the substrate.

37. The roofing material of claim 36, wherein the first bituminous layer is modified to enhance the properties of the bitumen.

38. The roofing material of claim 37, wherein the first bituminous layer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or polyethylene (PE).

39. The roofing material of claim 38, wherein the first bituminous layer is a polymer modified bituminous layer that is adhesive.

40. The roofing material of claim 38, wherein the first bituminous layer is a polymer modified bituminous layer that is non-adhesive.

41. The roofing material of claim 39, wherein the second bituminous adhesive layer is a polymer modified bituminous adhesive layer.

42. The roofing material of claim 40, wherein the second bituminous layer is modified with styrene-butadiene-styrene (SBS), styrene-ethylene-butadiene-styrene (SEBS), amorphous poly alpha olefin (APAO), or polyethylene (PE).

43. The roofing material of claim 36, wherein the first bituminous layer is the same as the second bituminous adhesive layer.

44. The roofing material of claim 36, wherein the first adhesive bituminous layer and the second adhesive bituminous are each polymer-modified.

45. The roofing material of claim 44, wherein the first adhesive bituminous layer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or polyethylene (PE) and the second adhesive bituminous layer is modified with styrene-butadiene-styrene (SBS), styrene-ethylene-butadiene-styrene (SEBS), amorphous poly alpha olefin (APAO), or polyethylene (PE).

46. The roofing material of claim 36, wherein the first bituminous layer is an unmodified bituminous layer, which is non-adhesive.

47. The roofing material of claim 36, wherein the inner surface and the outer surface of the removable release liner are each treated with a release agent prior to the printing of the transfer chemical material on the inner surface.

48. The roofing material of claim 47, wherein the release agent is silicone.

49. The roofing material of claim 36, wherein the transfer chemical pattern has a desired area selected to provide a partial adhesion of greater than 30% adhesion.

50. The roofing material of claim 36, wherein the transfer chemical pattern has a desired area selected to provide a partial adhesion of about 40% to 80% adhesion.

51. The roofing material of claim 36, wherein the transfer chemical pattern has a desired area selected to provide a partial adhesion of about 50% adhesion.

52. The roofing material of claim 36, wherein the first bituminous layer further comprises a fire retardant as filler.

53. The roofing material of claim 36, wherein the first bituminous layer further comprises a surfacing agent.

54. The roofing material of claim 53, wherein the surfacing agent is a mineral granule.

55. The roofing material of claim 53, wherein the surfacing agent is a fabric material.

56. The roofing material of claim 53, wherein the surfacing agent is a polyolefinic film.

57. The roofing material of claim 36, wherein the material is a membrane.

58. The roofing material of claim 36, wherein the material is a shingle.

59. The roofing material of claim 36 that is a
a) cap sheet;
b) base sheet;
c) tile underlayment; or
d) metal underlayment.

60. A method of manufacturing the roofing material of claim 36, said method comprising:
a) providing a carrier sheet having a top surface and a bottom surface, wherein a first bituminous layer is attached to the top surface and a second bituminous layer, which is different from the first bituminous layer, said second layer comprising an adhesive and being attached to the bottom surface;
b) printing the transfer chemical pattern onto the release liner; and
c) applying the release liner with transfer chemical material to the bottom of the second bituminous layer.

61. The method of claim 60, further comprising applying a surfacing agent to the top surface of the first bituminous layer to form a surfacing agent-coated surface.

62. The method of claim 61, further comprising cutting the roofing material to a desired length.

63. The method of claim 62, further comprising winding the roofing material into a roll.

64. The method of claim 60, further comprising applying an adhesive to the second bituminous layer, wherein the adhesive is a pressure-sensitive adhesive.

65. A self-adhesive ventilating roofing material, said material comprising:
a carrier sheet having a front side and a back side;
a first adhesive bituminous layer having an upper surface and a lower surface, wherein the first adhesive bituminous layer is attached on the lower surface to the front side of the carrier;
a second adhesive bituminous layer, having an upper surface and a lower surface, wherein the second adhesive bituminous layer is attached on the upper surface to the back side of the carrier sheet, wherein the second adhesive bituminous layer is the same as the first adhesive bituminous layer;
a removable release liner having an inner surface and an outer surface, wherein said removable release liner is removably attached on the inner surface to the lower surface of the second bituminous layer, said inner surface having a transfer chemical material printed thereon to form a transfer chemical pattern on the inner surface, the transfer chemical material being coupled to the second bituminous layer according to the pattern, the pattern forming a plurality of lateral ventilation paths extending along the lower surface of the bituminous adhesive layer; and
wherein upon removal of the release liner and application of the roofing material to a substrate, the transfer chemical remains coupled to the second adhesive bituminous layer such that partial adhesion to the substrate results, the pattern being selected to provide ventilation between the roofing material and the substrate.

66. The self-adhesive ventilating roofing material of claim 65, wherein the first adhesive bituminous layer and the second adhesive bituminous layer are each modified with a polymer.

67. The self-adhesive ventilating roofing material of claim 66, wherein the first adhesive bituminous layer polymer is modified with atactic polypropylene (APP), styrene-butadiene-styrene (SBS), styrene-ethylene-butadiene-styrene (SEBS), thermoplastic polyolefin (TPO), amorphous poly alpha olefin (APAO), or Polyethylene (PE) and the second adhesive bituminous layer polymer is modified with styrene-butadiene-styrene (SBS), styrene-ethylene-butadiene-styrene (SEBS), amorphous poly alpha olefin (APAO), or polyethylene (PE).

68. The self-adhesive ventilating roofing material of claim 66, wherein the transfer chemical pattern has a desired area selected to provide a partial adhesion of about 40% to 80% adhesion.

69. The self-adhesive ventilating roofing material of claim 65, wherein the first adhesive bituminous layer is an unmodified bituminous layer.

70. The self-adhesive ventilating roofing material of claim 65, wherein the inner surface and the outer surface of the removable release liner is treated with a release agent prior to the printing of the transfer chemical material on the inner surface.

71. The self-adhesive ventilating roofing material of claim 70, wherein the release agent is silicone.

72. The self-adhesive ventilating roofing material of claim 65, wherein the transfer chemical pattern has a desired area selected to provide a partial adhesion of greater than 30% adhesion.

73. The self-adhesive ventilating roofing material of claim 65, wherein the transfer chemical pattern has a desired area selected to provide a partial adhesion of about 50% adhesion.

74. The self-adhesive ventilating roofing material of claim 65, wherein the first bituminous adhesive layer further comprises a fire retardant as a filler or the first bituminous adhesive layer and the second bituminous adhesive layer each further comprises a fire retardant as a filler.

75. The self-adhesive ventilating roofing material of claim 65, wherein the first bituminous adhesive layer further comprises a surfacing agent on the upper surface.

76. The self-adhesive ventilating roofing material of claim 65, wherein the material is a membrane.

77. The self-adhesive ventilating roofing material of claim 65, wherein the material is a shingle.

78. The self-adhesive ventilating roofing material of claim 65 that is a
a) cap sheet;
b) base sheet;
c) tile underlayment; or
d) metal underlayment.

79. A self-adhesive roofing membrane, comprising:
a roofing material adapted for waterproofing, sealing and/or covering a construction surface, said material having an upper and lower surface;
an adhesive component for adhering the lower surface of the material to the construction surface, the adhesive component having an outer periphery that includes a first edge, a second edge opposite the first edge, a third edge, and a fourth edge opposite the third edge;
a release liner for protecting said adhesive component having an outer surface and an inner surface, wherein said inner surface is removably attached to the adhesive component;
wherein the inner surface of the release liner includes a transfer chemical, printed thereon to form a transfer chemical pattern, adapted to be transferred onto the adhesive layer and to render the adhesive component non-adhesive in areas where the transfer chemical has been transferred, the transfer chemical being attached to the release liner in such a way that upon removal of the release liner from the construction material only the adhesive component outside the transfer chemical pattern is capable of adhering to the construction substrate; such that when the membrane is applied to the substrate it is adhered to the substrate in areas outside of the chemical transfer pattern, the transfer chemical pattern being coupled to the adhesive layer and forming a continuous path from the first edge to the second edge and a continuous path from the third edge to the fourth edge,
said transfer chemical pattern being selected to allow for ventilation between the roofing material and the substrate.

80. The self-adhesive construction material of claim 79, wherein the portion of the adhesive layer that is not covered by the transfer chemical pattern is greater than 30 %.

81. The self-adhesive construction material of claim 79, wherein the portion of the adhesive component that is not covered by the transfer chemical pattern is about 40 % to 80 %.

82. The self-adhesive construction material of claim 79, wherein the portion of the adhesive component that is not covered by the transfer chemical pattern is about 50 % of the adhesive component.

83. The self-adhesive construction material of claim 79, wherein the transfer chemical pattern is selected to form a plurality of interconnected ventilation paths when the lower surface of the material is adhered to the construction surface.

84. A method of manufacturing a roofing membrane, comprising:
a) providing a carrier sheet having an adhesive surface;
b) providing a release liner;
c) printing a transfer chemical onto the release liner to form a chemical transfer pattern; and
d) applying the release liner with transfer chemical material to the adhesive surface such that the transfer chemical contacts an area of the adhesive surface to render the area non-adhesive along a plurality of ventilation paths according to the chemical transfer pattern, wherein the printed transfer chemical is configured to separate from the release liner upon removal of the release liner from the adhesive surface.

85. The method according to claim 84, wherein the transfer chemical is a lacquer.

* * * * *